March 1, 1927.
C. B. COUNTS
DOOR FOR COTTON SEED BOXES
Filed May 8, 1926
1,619,784
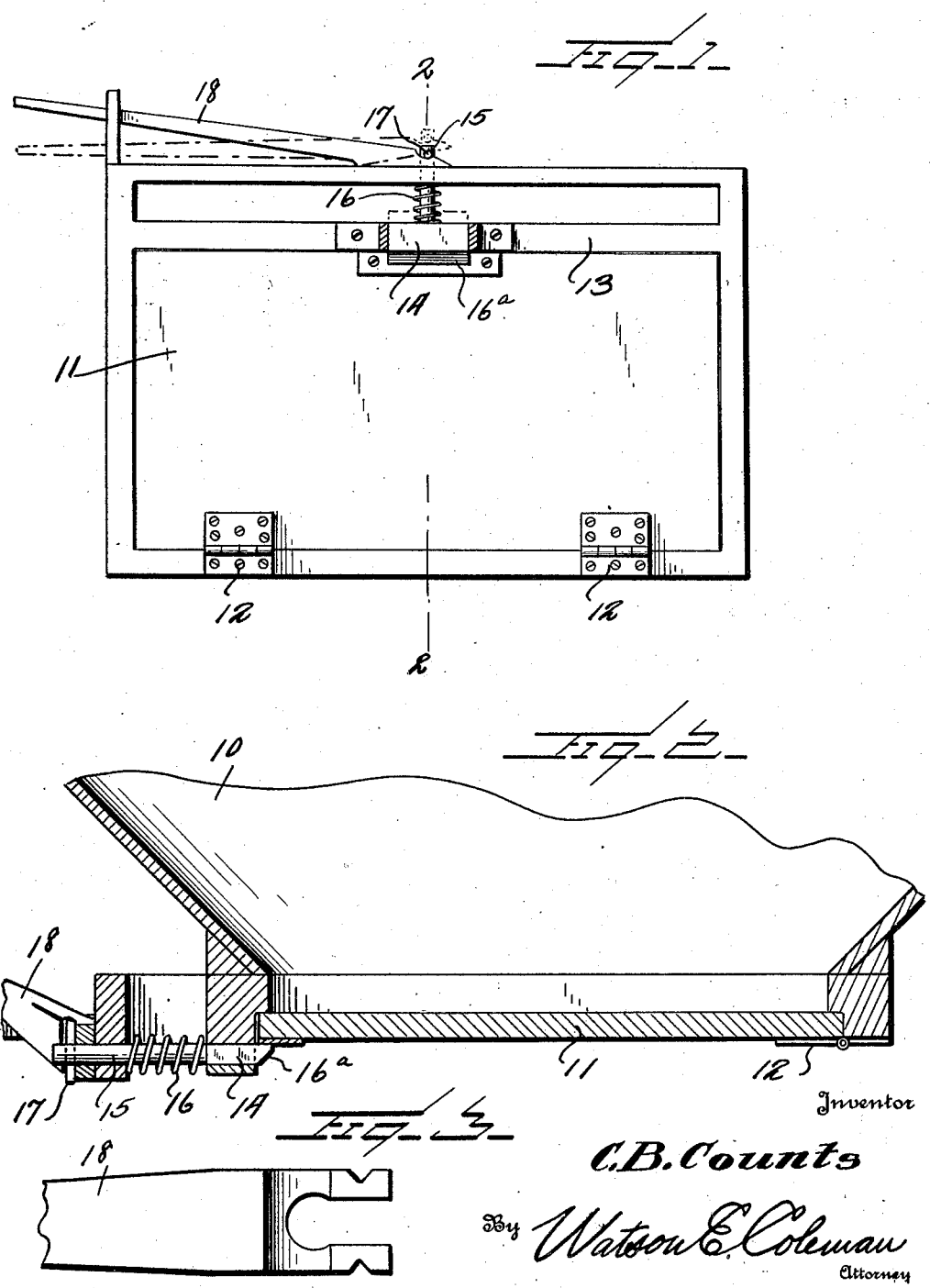

Patented Mar. 1, 1927.

1,619,784

UNITED STATES PATENT OFFICE.

CHARLES B. COUNTS, OF HAMPTON, ARKANSAS, ASSIGNOR OF ONE-HALF TO H. B. EASTERLING, OF HAMPTON, ARKANSAS.

DOOR FOR COTTONSEED BOXES.

Application filed May 8, 1926. Serial No. 107,829.

This invention relates to doors and particularly the doors of the cotton seed boxes of cotton gins.

The general object of the invention is to provide a door for the seed boxes of cotton gins, which door is hinged and provided with a spring latch capable of holding the door closed against the weight and pressure of the cotton seed and to provide means whereby the spring latch may be withdrawn by means of a lever or like device in order to permit the discharge of the cotton seed into a wagon, the latch being of such construction as to permit the door to be latched automatically when the door is closed.

My invention is illustrated in the accompanying drawings wherein:—

Figure 1 is a bottom plan view of the door to a cotton seed box;

Figure 2 is a section on the line 2—2 of Figure 1;

Figure 3 is a fragmentary top plan view of the lever for operating the latch.

Referring to these drawings, 10 designates the seed box of a cotton gin. This box is normally deep enough to hold a bale of cotton seed and receives the seed blown from the gin stand into the box. Operating in this bottom is a door 11 hinged at 12, and coacting with a transverse member 13. Operating within this transverse member and guided thereby and operating through the side wall of the box is the latch bolt 14 provided with the reduced shank 15 surrounded by a coiled spring 16 which forces the latch bolt inward and toward the door so as to hold the door locked. The edge of the latch bolt is beveled as at 16ª and the outer end of the latch bolt is provided with a transversely extending pin 17. Operating on this pin is the lever 18 which is forked at its end so as to engage beneath the pin. This lever may be mounted upon the door in any suitable manner and fulcrums against the frame of the door so that when the outer end of the lever is depressed, the latch will be withdrawn from its engagement with the door and the door will be opened under the weight of the cotton seed. Means are provided whereby the latch may be held retracted while the cotton seed box is discharging into the wagon.

With this construction, when the cotton is ginned, the wagon is driven under the seed box and the lever is pulled toward the box and the weight of about a thousand pounds of cotton seed throws the door open, discharging the seed into the box. When the seed has been discharged, the operator in the wagon raises the door to its closed position and it latches itself.

I claim:—

In a cotton gin, a seed box having a hopper-like bottom and a discharge opening, the opening being defined by a frame, the frame including two parallel members, a spring-projected latch having sliding engagement in the two parallel members and normally projecting into a position beyond the inner edge of the innermost member, a door hinged to said frame and having its free end normally engaged by the latch, a lever fulcrumed against the outermost of said parallel members and having its end bifurcated and operatively engaging the extremity of the latch, the lever projecting beyond the member upon which it is mounted and having means for holding it in operative position.

In testimony whereof I hereunto affix my signature.

his
CHARLES B. X COUNTS.
                  mark